US007990672B2

(12) United States Patent
Arnold

(10) Patent No.: US 7,990,672 B2
(45) Date of Patent: Aug. 2, 2011

(54) SUPERVISION CIRCUIT TO DETECT VERY FAST POWER SUPPLY DROPS

(75) Inventor: Matthias Arnold, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 313 days.

(21) Appl. No.: 12/234,912

(22) Filed: Sep. 22, 2008

(65) Prior Publication Data

US 2010/0073836 A1 Mar. 25, 2010

(51) Int. Cl.
*H02H 3/24* (2006.01)

(52) U.S. Cl. .......................................... 361/92; 361/86

(58) Field of Classification Search .................... 361/86, 361/92

See application file for complete search history.

(56) References Cited

U.S. PATENT DOCUMENTS 4,428,020 A * 1/1984 Blanchard, Jr. ................. 361/90
2008/0239605 A1* 10/2008 Kataoka et al. ................. 361/92

FOREIGN PATENT DOCUMENTS

JP 06224701 A * 8/1994

OTHER PUBLICATIONS

English Language Abstract of Japanese Patent (JP 06224701 A), Aug. 1994.*

* cited by examiner

*Primary Examiner* — Jared Fureman
*Assistant Examiner* — Scott Bauer
(74) *Attorney, Agent, or Firm* — Robert D. Marshall, Jr.; W. James Brady; Frederick J. Telecky, Jr.

(57) ABSTRACT

This invention is power supply protection for complex digital circuits employing an external high voltage supply and an internally generated low voltage core logic supply. Precision analog comparators distinguish between short circuit conditions on the internal supply at various ramp down rates including slow brown out decay. Control circuitry protects I/O circuits from exposure to high currents as a result of possible floating gate conditions in the output circuitry.

3 Claims, 8 Drawing Sheets

Medium VDD Step

SUPERVISION CIRCUIT TO DETECT VERY FAST POWER SUPPLY DROPS

TECHNICAL FIELD OF THE INVENTION

The technical field of this invention is detection of very fast voltage drops in power supplies.

BACKGROUND OF THE INVENTION

In systems having internal voltage regulators providing an internal power supply for a digital core, the internal power supply VDD may act totally independently from the power supply HDVDD for I/O functional elements. Often this internal power supply VDD is connected to an external capacitor and VDD is subject to external short circuits. Short circuit at VDD could result in a floating condition at the inputs to the I/O circuits and harmful extraneous currents flowing through the I/O from its power supply. It is imperative to detect this short circuit condition on the internal supply to set the I/O functions into a high impendence (HiZ) state eliminating floating inputs.

FIG. 1 illustrates a typical protection circuit of prior art. The internal voltage regulator 101, often based on a band gap temperature compensated reference, provides the power VDD 105 for core logic 108. External supply voltage HVDD 110 supplies all circuitry operating at nominal VDD range including I/O circuits 104 supplied from a separate external device pin HVDD 112. The power supply includes an internal capacitor 111 and an external pin 113 for attachment of an external capacitor. Internal voltage regulator 101 and I/O circuits 104 are powered between HVDD supply 110 and ground 100. Core logic 108 is powered between VDD supply and ground 100. Differential analog comparator 102 detects a low voltage on VDD at input 105. Differential analog comparator 102 has an inverting input 105 receiving VDD and a non-inverting input 109 receiving a reference voltage VREF. Upon the occurrence of a low voltage at input 105, analog comparator 102 produces a rapid high going signal at output 106. This drives inverter 103 producing a low at node 107, the active low HiZ_input to I/O circuits 104. This active low HiZ_input places I/O circuits 104 in an off condition.

There are two conceivable scenarios for VDD supply failures. The first scenario is DROOP, where supply VDD drops so slowly there is enough time to develop reset signals of sufficient amplitude. The second scenario is SHORT, where VDD drops immediately as by a short circuit. This drop is so fast that reset signals do not have enough time to attain sufficient amplitude. In this case no circuit supplied from VDD is reliable. The I/O control signals from the core logic 108 are then considered as invalid.

Protection against unsafe power supply conditions requires effective detection that operates under failing VDD conditions that include extremely slow decay of VDD or moderate to fast changes resulting in VDD approaching 0.0 volts. Protection also must gate all I/O circuits into a HiZ condition when any potentially destructive power supply failure mechanisms in either VDD or HVDD are detected.

SUMMARY OF THE INVENTION

The power supply supervision circuit arrangement of this invention uses a voltage detection circuit to detect fast decay of main circuit supply voltage. Additional analog comparators distinguish between short circuit conditions on the internal core logic supply at various ramp down rates. Power supply control circuitry acts upon carefully determined conditions and forces I/O circuits into a HiZ mode protecting them from exposure to high currents as a result of possible floating gate conditions in the output circuitry.

BRIEF DESCRIPTION OF THE DRAWINGS

These and other aspects of this invention are illustrated in the drawings, in which.

DETAILED DESCRIPTION OF PREFERRED EMBODIMENTS

Figure 2:
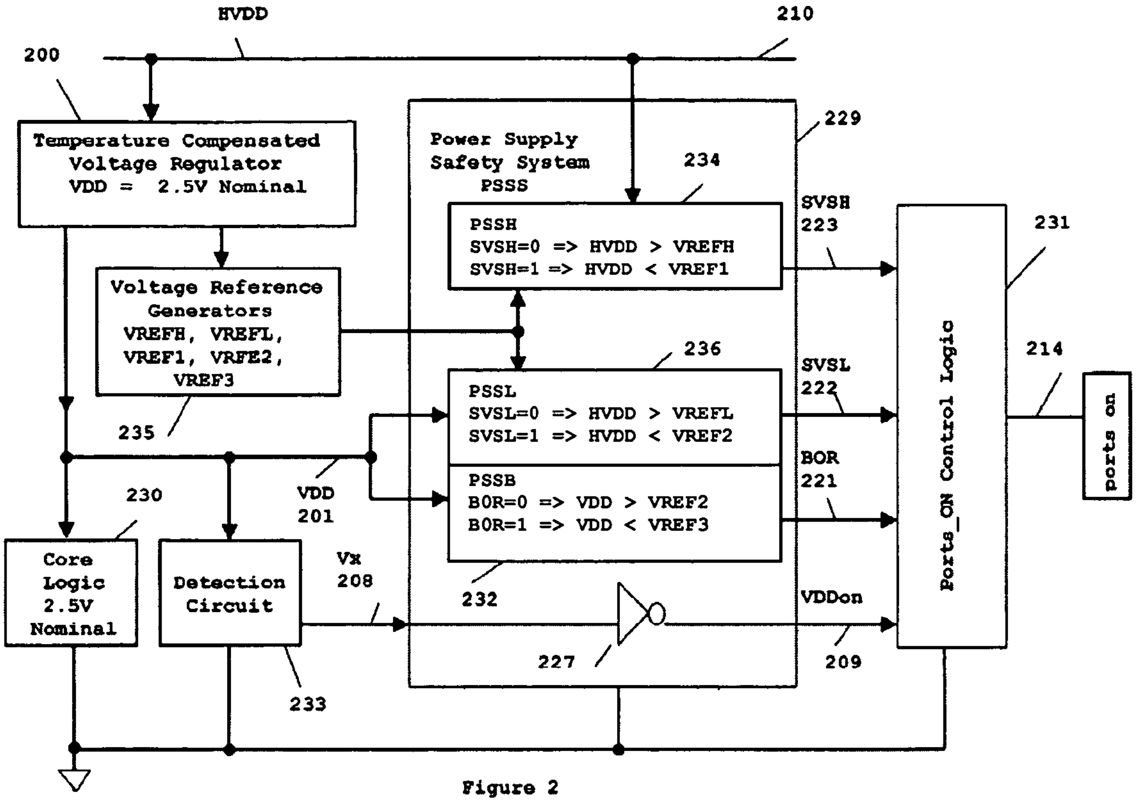
FIG. 2 illustrates in block diagram form the power supply safety system of this invention describing conditions for generation of the low ports_on signal to cause I/O circuitry to assume a HiZ state.

FIG. 2 illustrates in block diagram form the power supply safety system (PSSS) of this invention. FIG. 2 describes conditions for generation of the ports_on signal to cause I/O circuitry to assume a HiZ state.

Figure 1:
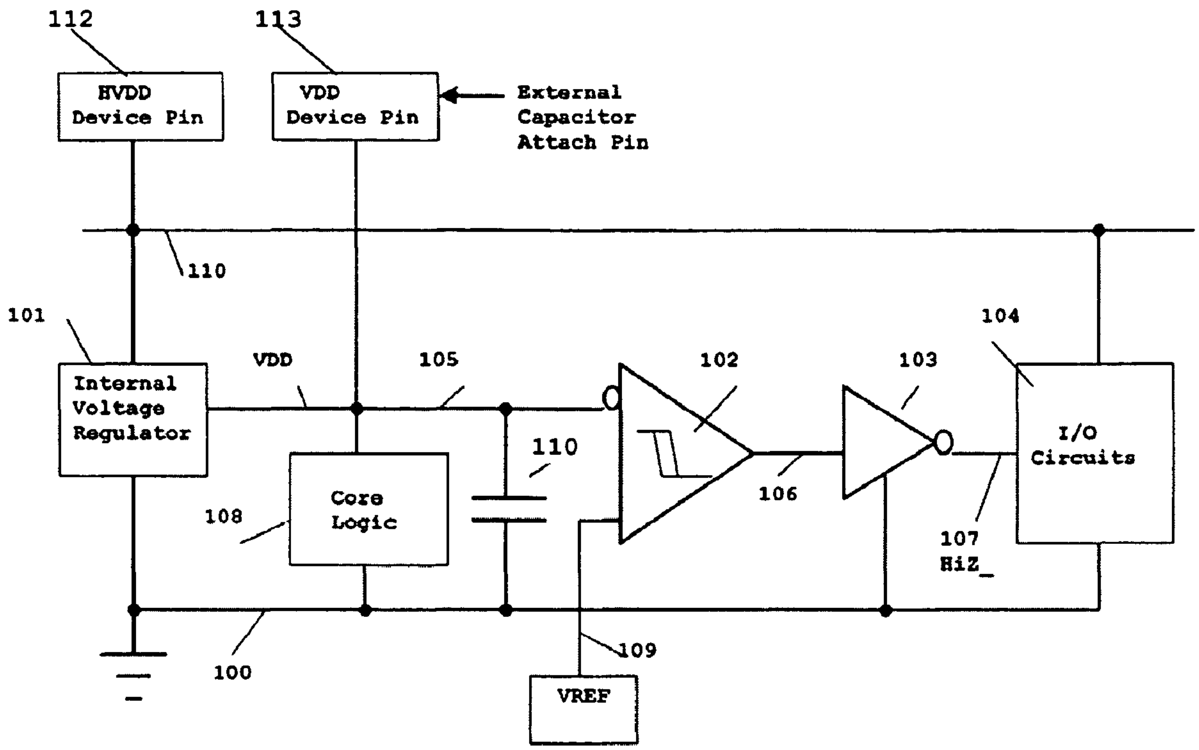
Figure 1 (Prior Art)
FIG. 1 illustrates a circuit diagram detecting a short circuit on the internal voltage supply and initiating action to place the I/O circuitry in a tri-stated condition (Prior Art)

In FIG. 2 external power is supplied by HVDD 210, supplying power for PSSS 229 and I/O circuits 104 (FIG. 1). Temperature compensated voltage regulator 200 generates VDD 201 supplying power to core logic 230. Analog scalar circuits are used in voltage generator block 235 to generate references voltages VREFH, VREFL, VREF1, VREF2, and VREF3 used in the PSSS block 229.

Detection circuit 233 monitors VDD 201 and generates a high-going signal at Vx 208 upon detecting a degradation in VDD 201. Inverter 227 drives the VDDon signal low at 209 to the ports_on control logic 231.

PSSS circuits 229 are divided into PSSL section 236, PSSB section 232, and PSSH section 234. PSSH 234 contains precision analog comparators detecting the range of HVDD. PSSH 234 generates SVSH as 0 if HVDD is greater than 3.0 V. PSSH 234 generates SVSH as 1 if HVDD is less than 2.8 V. PSSB circuit 232 produces output BOR 221 from the VDD signal 201. PSSL 232 generates BOR 221 as 0 if VDD is greater than the threshold voltage of a NMOS transistor.

PSSB 232 generates BOR 221 as 1 if VDD is less than 1.3 V. PSSL 236 produces output SVSL 222 from the VDD signal 201. PSSL 236 generates SVSL 222 as 0 if VDD is greater than 2.35 V. PSSL 236 generates SVSL 222 as 1 if VDD is less than 2.25 V. Signals BOR 221, SVSL 222, SVSH 223 and VDDon 209 supply ports_ON Control Logic 231 which determines ports_on signal 214. A low state in ports_on signal 214 forces I/O circuitry into a HiZ condition.

Both supplies VDD 201 and HVDD 210 are supervised by power supply safety system (PSSS) 229. PSSS 229 includes: a) PSSB circuits 232 generating BOR 221; PSSL circuit 236 generating SVSL 222; and PSSH circuit 234 generating SVSH 223. The following unsafe Power Supply Conditions are of interest.

For a brownout decaying VDD: brownout reset circuit PSSB 232 senses VDD; low supply supervisor PSSL 232 generates BOR; and PSSB 232 is powered by VDD. This brownout feature is always active when VDD>Vth, where Vth is NMOS threshold voltage, 1.0 V nom.

For a short circuit on VDD having a medium to high rate ramp down, low supply supervisor PSSL 236 VDD senses and generates an active SVSL 222. PSSL 236 uses precision comparators powered by VDD. PSSL 236 and internal reference voltage source 235 are powered by HVDD. For PSSL 236 to produce an active signal SVSL 222 it must have HVDDmin>2.0 V.

For a decaying HVDD with a medium to high rate ramp down: high supply supervisor PSSH 234 senses HVDD and generates SVSH 223. PSSH 234 uses precision comparators powered by HVDD. PSSH 234 employs an internal reference voltage source 235 and is powered by HVDD. PSSH 234 must have HVDDmin >2.0 V to operate properly.

Figure 3:
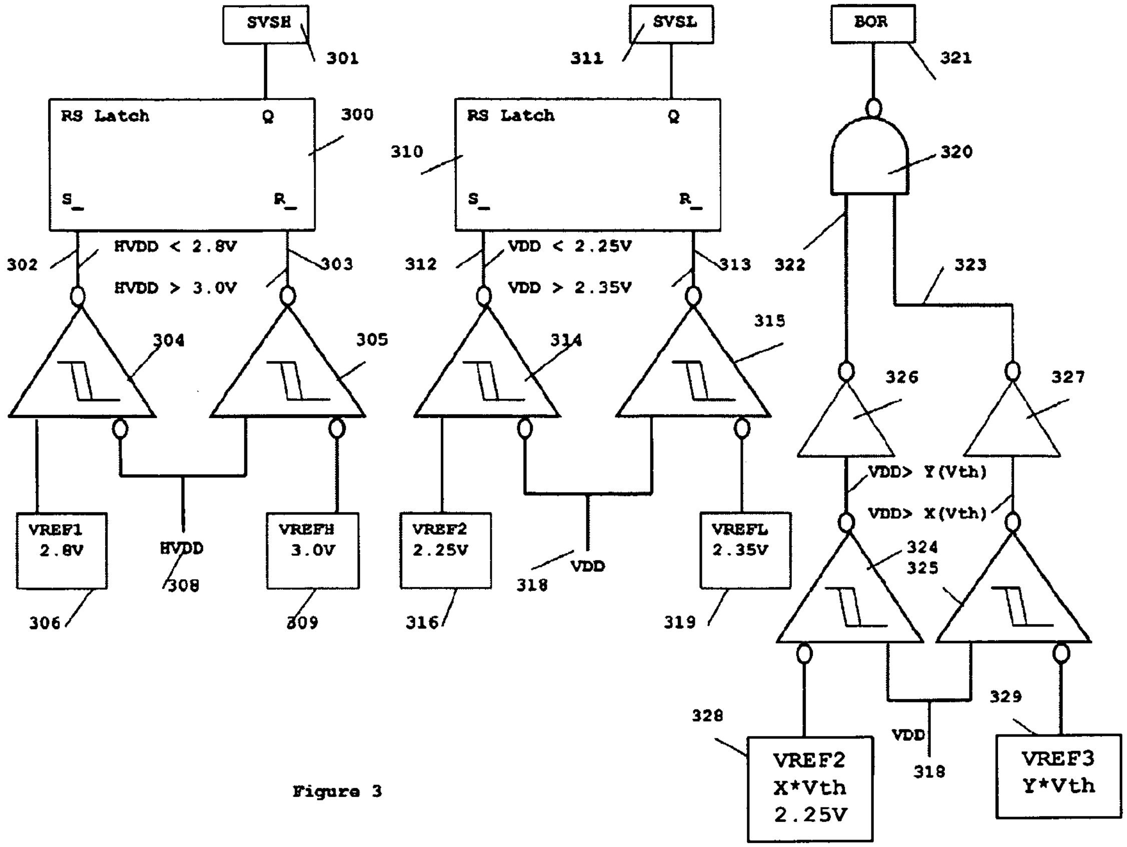
FIG. 3 illustrates the simplified circuit of a portion of the power supply system of this invention using a multiplicity of analog comparators detecting the occurrence of conditions described in FIG. 2 for responding to all unsafe power supply conditions.

FIG. 3 illustrates the simplified circuit of a portion of the power supply system of this invention using multiple precision analog comparators detecting the occurrence of conditions described in conjunction with FIG. 2.

Analog comparators 304 and 305 act as a pair to generate respective set signal 302 and reset set signal 303 for RS latch 300. In latch 300, a reset signal 302 overrides a set signal 303. If both signals are low at the same time, reset signal 303 places latch 300 in a low state (Q=0). Initially, with HVDD above VREFH at terminal 309 (preferably 3.0 V) latch 300 is reset by a low signal at reset signal 303. If HVDD falls below VREFH but remains above VREF1 at terminal 306 (preferably 2.8 V), reset signal 303 goes high but latch 300 remains in the reset condition (SVSH=0). If HVDD falls below VREF1, set signal 302 goes low placing the latch in the set condition (SVSH=1). Table 1 describes the response of SVSH 301 to degradation in HVDD over the full range of voltage.

TABLE 1

| HVDD | R 303 | S 302 | SVSH 301 |
|---|---|---|---|
| HVDD > VREFH | LOW | HIGH | LOW |
| VREF1 < HVDD < VREFH | HIGH | HIGH | LOW |
| HVDD < VREF1 | HIGH | LOW | HIGH |

Analog comparators 314 and 315 act as a pair to generate respective set signal 312 and reset signal 313 for latch 310. In latch 310, a reset signal 313 overrides a set signal 312. If both signals are low at the same time, reset signal 313 places the latch in a low state (Q=0). Initially, with VDD above VREFL at terminal 319 (preferably 2.35 V) latch 310 is reset by a low at signal input 313. If VDD falls below VREFL but remains above VREF2 at terminal 316 (preferably 2.25 V), reset signal 313 goes high but the latch remains in the reset condition (SVSL=low). If VDD falls below VREF2, set signal 312 goes low placing the latch in the set condition (SVSL=high). Table 2 describes the response of SVSL 311 to degradation in VDD over the full range of voltage.

TABLE 2

| VDD | R_313 | S_312 | SVSL 311 |
|---|---|---|---|
| VDD > VREFL | LOW | HIGH | LOW |
| VREF2 < VDD < VREFL | HIGH | HIGH | LOW |
| VDD < VREF2 | HIGH | LOW | HIGH |

Analog comparators 324 and 325 act as a pair to generate respective control signals for BOR output gate 320. Comparator 324 compares the output voltage VDD with VREF2 (X*Vth preferably 2.25 V) input at terminal 328. This comparison signal is inverted by inverter 326. Comparator 325 compares the output voltage VDD with VREF3 (Y*Vth) input at terminal 329. This comparison signal is inverted by inverter 327. Table 3 describes the response of BOR 321 to degradation in VDD over the full range of voltage.

TABLE 3

| VDD | 322 | 323 | BOR 321 |
|---|---|---|---|
| VDD > X * Vth | HIGH | HIGH | LOW |
| Y * Vth < VDD < X * Vth | LOW | HIGH | HIGH |
| VDD < Y * Vth | LOW | LOW | HIGH |

BOR 321 is not driven by a latch, but is determined only by the conditions described in Table 3. BOR 321 is low if VDD is greater than VREF2 (X*Vth preferably 2.25 V) and high if VDD is less than VREF3 (Y*Vth) where X>1, Y>1 and X>Y.

Figure 4:
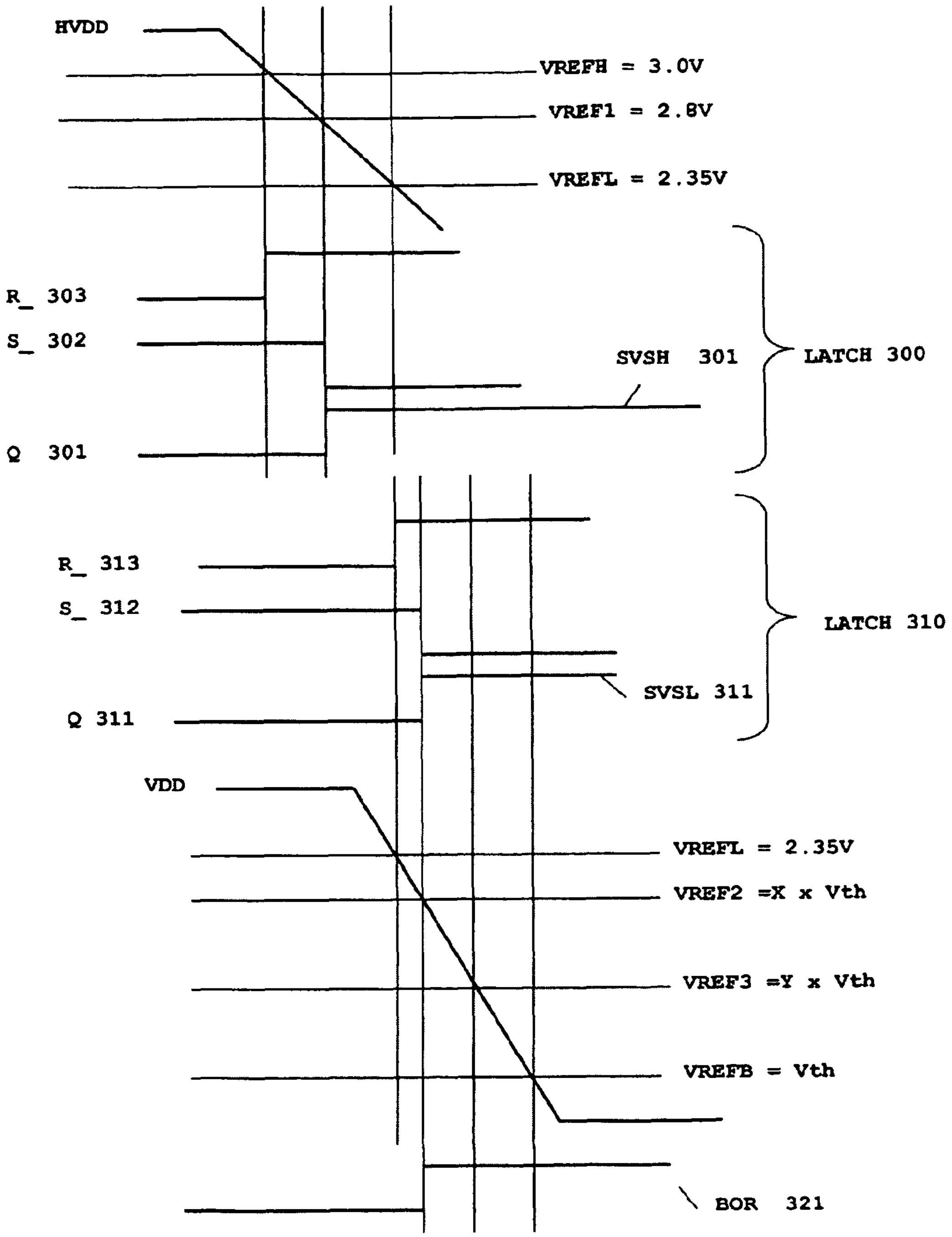
FIG. 4 illustrates waveforms describing voltage changes on HVDD and VDD and the generation of SVSH, SVSL, and BOR signals responding to the threshold levels described in FIG. 2.

FIG. 4 illustrates the waveforms showing response of SVSH, SVSL, and BOR to degradation in HVDD and VDD described in Tables 1 to 3.

Figure 5:
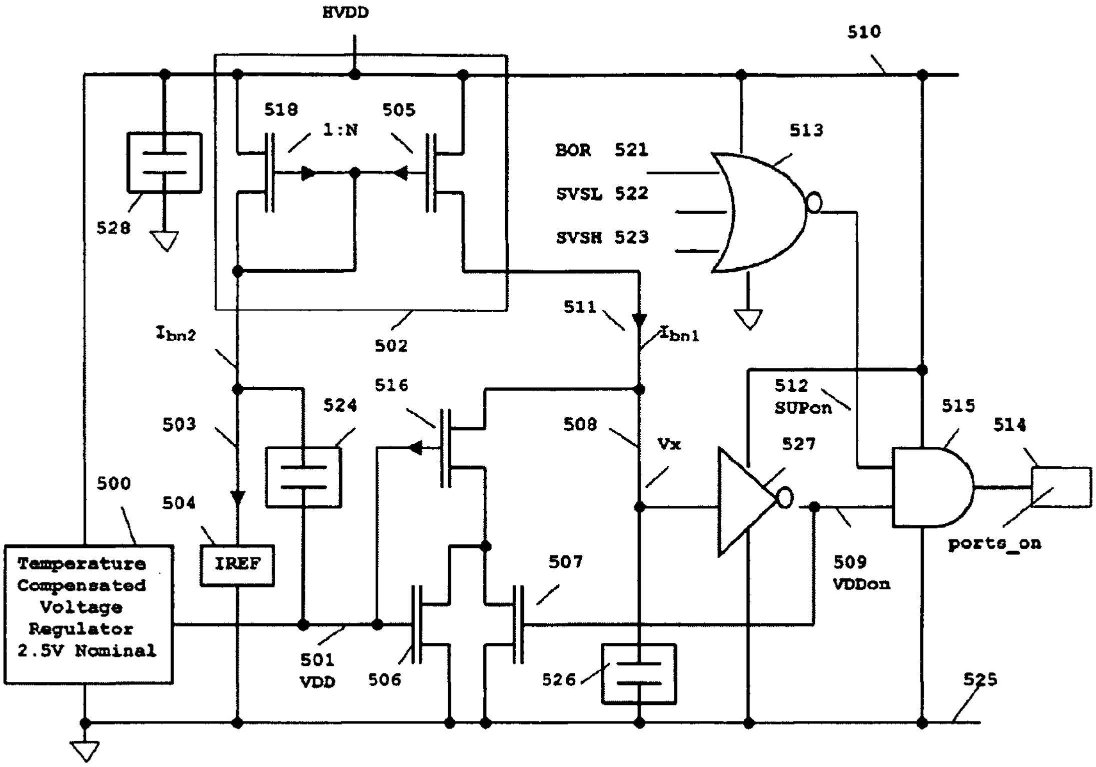
FIG. 5 illustrates the logic diagram of the circuit used in the preferred embodiment of this invention to respond to all unsafe power supply conditions anticipated in both the VDD voltage supply for core logic circuits and the HVDD voltage supply for I/O circuitry.

FIG. 5 illustrates the complete logic diagram of the circuit used in this invention to respond to all unsafe power supply conditions. Current source 502 supplies current Ibn1 511 from the HVDD supply 510 to the drain of an NMOS transistor 516. The gate of NMOS transistor 516 is connected to VDD 501 which is the supervised internal supply. Node Vx 508 at drain of NMOS transistor 516 is connected to the input of an inverter 527 supplied from HVDD 520. Transistors 506 and 507 produce a hysteresis in the response of the detection circuit. Capacitor 528 performs filtering on the HVSS supply 510.

FIG. 5 illustrates the complete logic diagram of the circuit used in this invention to respond to all unsafe power supply conditions. Current source 502 supplies current Ibn1 511 from the HVDD supply 510 to the drain of an NMOS transistor 516. The gate of NMOS transistor 516 is connected to VDD 501 which is the supervised internal supply. Node Vx 508 at drain of NMOS transistor 516 is connected to the input of an inverter 527 supplied from HVDD 510. Transistors 506 and 507 produce a hysteresis in the response of the detection circuit. Capacitor 528 performs filtering on the HVSS supply 510.

If VDD 501 remains larger than the threshold voltage Vth of the NMOS switch composed of transistors 506, 507, and 516, node VX 508 is pulled down to VSS (ground) 525. Inverter 527 causes VDDon 509 to high. When VDD 501 drops below Vth, current Ibn1 511 pulls up node Vx 508. Inverter 527 forces VDDon 509 low. The rate at which VDD falls is not significant because this circuit operates from HVD 510.

The drain of PMOS transistor 505 of current source 502 is connected to the drain of NMOS transistor 516. The gate of transistor 516 receives VDD 501. IREF 504 sets a bias current Ibn2 503 to approximately 10 nA. Current source 502 supplies node Vx 508 with 40 nA driving node Vx 508 high and inverter 527 drives VDDon 509 low. Note that current ibn2 503 set by IREF 504, must be stable before there is action on node Vx 508. Note that current ibnl 511 is N times current ibn2 503.

Whenever VDD exceeds the threshold voltage of NMOS transistor 506, node Vx 508 is pulled towards VSS and inverter 527 drives node VDDon 509 high. Node SUPon 512 is high only when inputs BOR 521, SVSL 522 and SVSH 523 of NOR gate 513 are all low. Output ports_on 514 of AND gate 515 is low when both VDDon 509 and SUPon 512 are both high. Output ports_on 514 functions to disable the I/O circuits.

The two scenarios for VDD supply failures have an effect on the circuit. In the first scenario supply VDD 501 drops slowly so that there is enough time for SVS and BOR to disable the I/Os via SUPon 512. In the second scenario supply VDD 501 drops immediately caused by a short, so fast that SVS and BOR do not have enough time to provide a pulse of sufficient amplitude to drive reset SUPon low. In this case, the inverter 527 will drive VDDon 509 low and disable the I/Os.

The circuit of FIG. 5 has these additional characteristics. This circuit draws a quiescent current of approximately 50 nA (Ibn1+Ibn2) from the HVDD supply. The preferred embodiment of this circuit employs metal options to increase or decrease the quiescent current (Ibn1+Ibn2) by about 50%. Capacitor (C_SLOW) 526 which slows the response of VDDon can be connected via a metal option. Capacitor (C_FAST) 524 which speeds up the response of VDDon can be connected via metal option. Since circuits generating BOR 521 and SVSL 522 are in the low supply domain (VDD), level shifters are needed to translate these signals properly in the HVDD domain.

Figure 6:
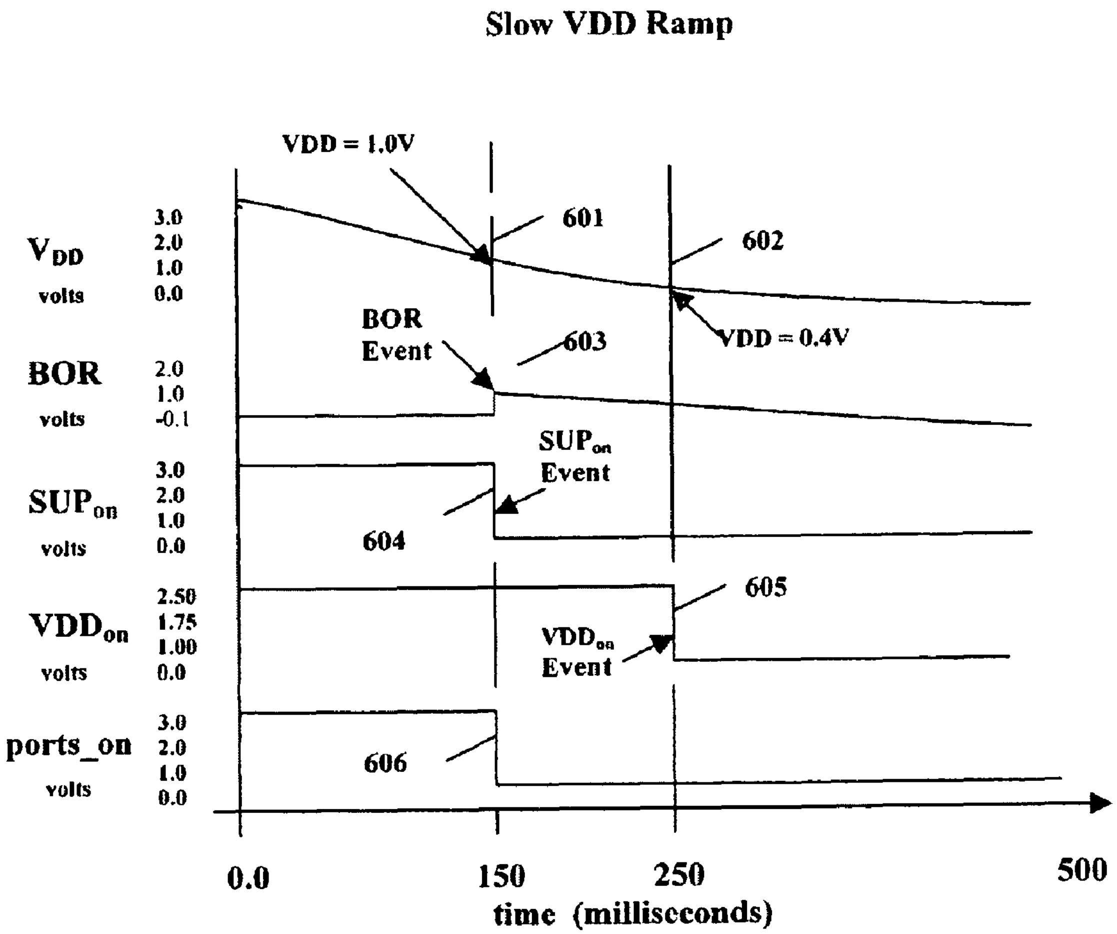
FIG. 6 illustrates the response of signals BOR, SUPon, VDDon, and ports_on to a slow falling VDD ramp voltage, the Droop condition.

FIG. 6 illustrates the response of signals BOR 521, SUPon 512, VDDon 509 and ports_on signal 514 to a slow falling ramp voltage in VDD 501. Event 601 coincides with VDD=1.0 V and event 602 coincides with VDD=0.4 V. With VDD falling slowly (this example takes 300 milliseconds to ramp down from 2.5 V to 0.0 V) ports_on 514 is triggered by the BOR event 603, which causes SUPon event 604 via NOR gate 513. VDDon 509 falls abruptly at 605 and ports_on 514 responds to the BOR event 603 at 606. BOR 521 works as intended and causes a high going output properly. Ports_on 514 goes low. This is called DROOP.

Figure 7:
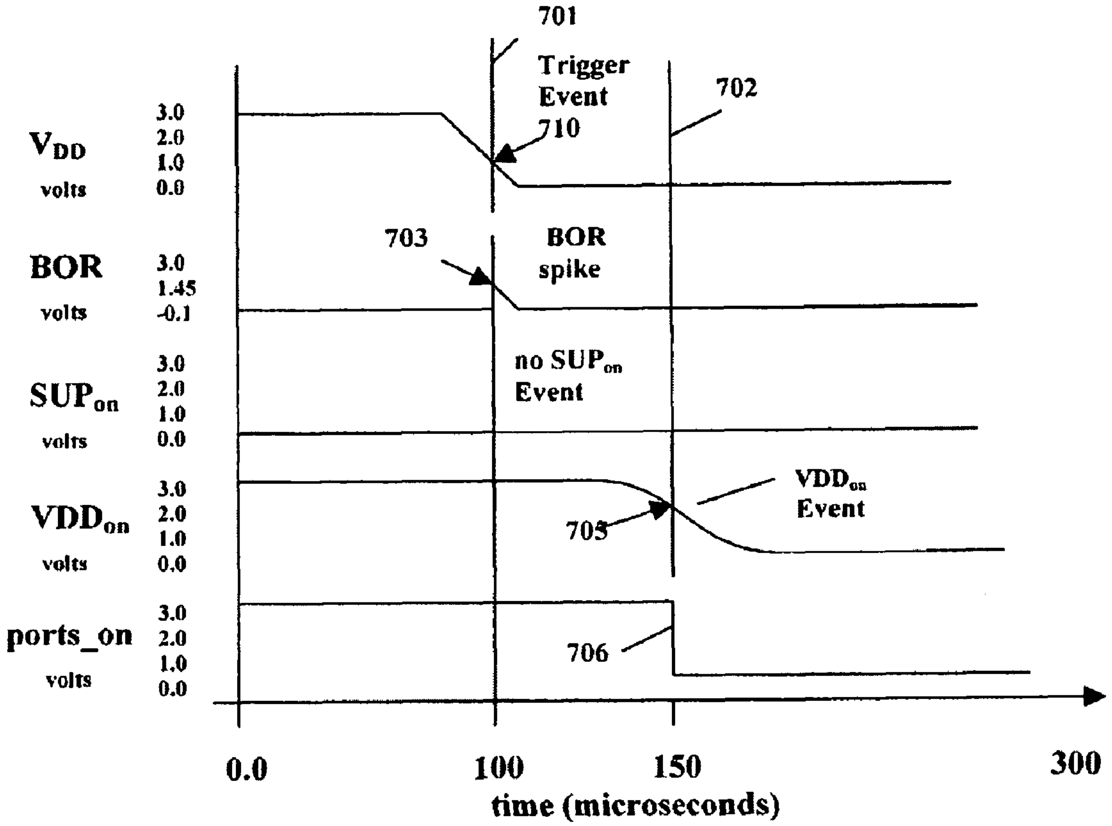
FIG. 7 illustrates the response of signals BOR, SUPon, VDDon, and ports_on to a medium range VDD step input, a mixture of Droop and short conditions.

FIG. 7 illustrates the response of signals BOR 521, SUPon 512, VDDon 509 and ports_on 514 to a medium range VDD 501 step input. This example takes 200 nanoseconds to ramp down from 2.5 V to 0.0 V. Event 701 coincides with VDD=1.0 V where VDDon experiences a trigger event 710. BOR 521 responds with only a spike 703 causing no further action. Event 702 coincides with VDD=0.4 V, resulting in a slow falling VDDon 705. With VDD falling slowly (200 milliseconds to ramp down from 2.5 V to 0.0 V) ports_on falls at 706 as a result of VDDon crossing trip point 705 (VDD<Vth).

In FIG. 7 the ramp is steeper and BOR 521 does not work in an ideal manner. The circuit produces just a spike or glitch allowing this state to pass unnoticed if no other part of the system recognizes it. FIG. 2 includes detection circuit 233 and this circuit detects the failure condition when both VDDon and ports_on 706 go low. This presents a different failure condition, mastered as effectively as the first condition. This condition is a mixture between DROOP and SHORT.

Figure 8:
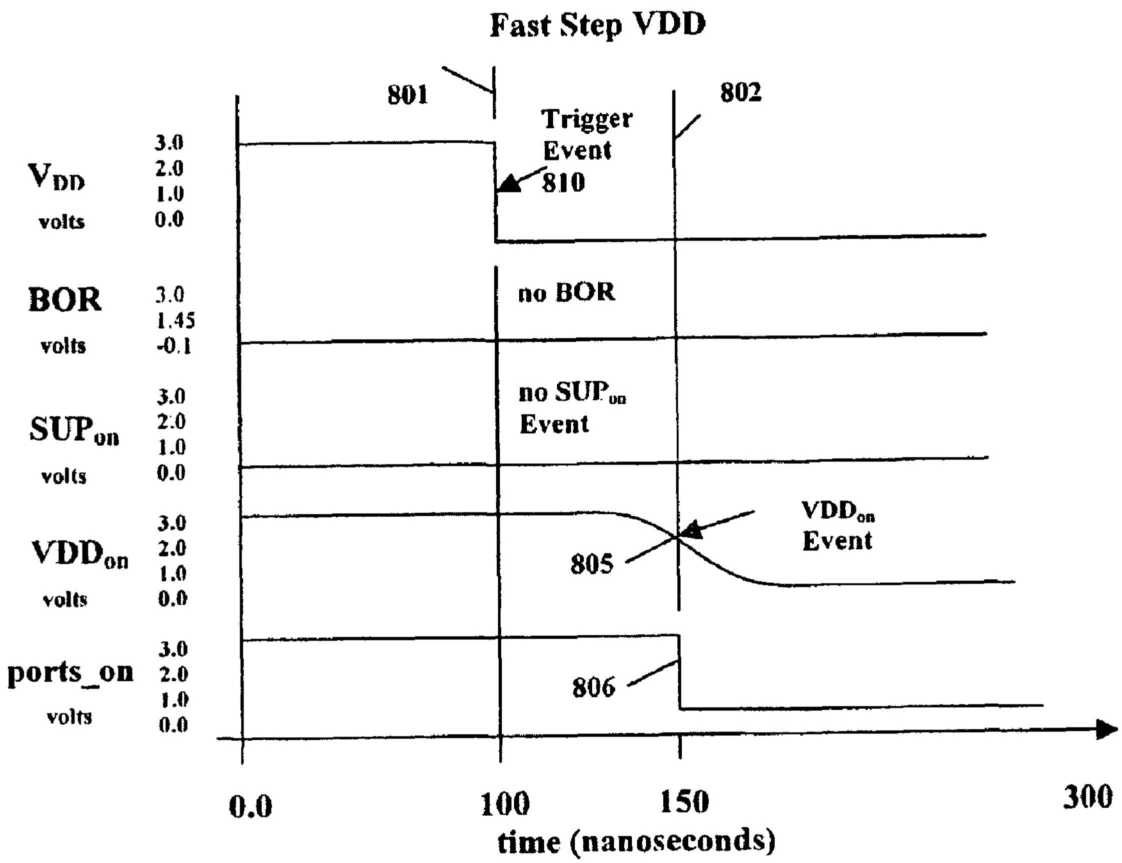
FIG. 8 illustrates the response of signals BOR, SUPon, VDDon, and ports_on to a fast range VDD step input, a short circuit.

FIG. 8 illustrates the response of signals BOR 521, SUPon 512, VDDon 509 and ports_on 514 to a fast range VDD step input taking 10 nanoseconds to ramp down from 2.5 V to 0.0 V. Event 801 coincides with VDD rapidly passing through the trip point VDD=1.0 V. VDDon experiences a trigger trigger event 810 (VDD<1.0 V). BOR 521 and SUPon 512 do not respond. Event 802 coincides with VDD=0.4 V, resulting in a slow falling VDDon 805. With VDD falling slowly ports_on 514 falls at time 806 when the voltage at node Vx 508 crosses the input threshold of inverter 527.

FIG. 8 presents a third failure condition where the drop is so fast that there is no BOR reaction at all. Detection circuit 233 also reacts here and the result is like in the other 2 cases that ports_on 514 goes low. This is the SHORT case. The BOR spike is not intended, but due to the system design there is always a correct response (ports_on 514 going low).

What is claimed is:

1. A power supply system with low voltage protection comprising:

an unregulated power supply;

a power supply regulator connected to said unregulated power supply and generating a regulated power supply voltage;

core logic connected to said power supply regulator and powered by said regulated power supply having at least one input and/or output;

a first protection circuit connected to said unregulated power supply and generating a first low voltage protection signal indicating if said unregulated power supply voltage is below a first reference voltage;

a second protection circuit connected to said regulated power supply and generating a second low voltage protection signal indicating if said regulated power supply voltage is below a second reference voltage, said second reference voltage less than said first reference voltage;

a ports on control logic connected to said first and second low voltage protection circuits and generating a ports on control signal in an active state if said first low voltage protection signal does not indicate said unregulated power supply voltage is below said first reference voltage and said second low voltage protection signal does not indicate said regulated power supply voltage is below said second reference voltage, in an inactive state if said first low voltage protection signal indicates said unregulated power supply voltage is below said first reference voltage or said second low voltage protection signal indicates said regulated power supply voltage is below said second reference voltage;

at least one input or output port, each port having an external connection, each port connected to a corresponding one of said at least one input and/or output of said core logic and to said ports on control logic, each port operable to pass signals between an input and/or output of said core logic said corresponding external connection if said ports on control signal has said active state, and present a high impedance to said corresponding external connection if said ports on control signal said inactive state;

a reference voltage generator connected to said unregulated power supply generating said second reference voltage and a third reference voltage, said second reference voltage greater than said third reference voltage;

a third protection circuit connected to said regulated power supply and generating a second low voltage protection signal indicating if said regulated power supply voltage is below said second reference voltage, said third protection circuit including a first inverting comparator having a first terminal connected to said second reference voltage, a second inverting terminal connected to said regulated power supply and an output, a first inverter having an input connected to said output of said first inverting comparator and an output, a second inverting comparator having a first inverting terminal connected to said third reference voltage, a second terminal connected to said regulated power supply and an output, and a second inverter having an input connected to said output of said second inverting comparator and an output, a NAND gate having a first input connected to said output of said first inverter, a second input connected to said output of said second inverter, an output generating a third low voltage protection signal; and wherein said ports on control logic is further connected to said third low voltage protection circuit and generates said ports on control signal in an active state only if said third low voltage protection signal does not indicate said regulated power supply voltage is below said second reference voltage.

2. The power supply system of claim 1, further comprising:

said reference voltage generator further generating said first reference voltage and a fourth reference voltage, said first reference voltage less than said fourth reference voltage; and wherein said first protection circuit includes a first comparator having a first terminal connected to said unregulated power supply, a second terminal connected to said fourth reference voltage and an output, a second comparator having a first terminal connected to said first reference voltage, a second terminal connected to said unregulated power supply and an output, and an set-reset flip flop having a reset terminal connected to said output of said first comparator, a set terminal connected to said output of said second comparator and an output generating said first low voltage protection signal.

3. The power supply system of claim 1, further comprising:

said reference voltage generator further generating said second reference voltage and a fourth reference voltage, said second reference voltage less than said fourth reference voltage; and wherein said second protection circuit includes a first comparator having a first terminal connected to said regulated power supply, a second terminal connected to said fourth reference voltage and an output, a second comparator having a first terminal connected to said second reference voltage, a second terminal connected to said regulated power supply and an output, and an set-reset flip flop having a reset terminal connected to said output of said first comparator, a set terminal connected to said output of said second comparator and an output generating said second low voltage protection signal.

* * * * *